United States Patent [19]
Allen

[11] 3,932,804
[45] Jan. 13, 1976

[54] NEUTRALIZING TRANSFORMER ARRANGEMENT

[76] Inventor: Gordon Y. R. Allen, 4 Ireland Court, Islington, Ontario, Canada

[22] Filed: Jan. 7, 1974

[21] Appl. No.: 431,367

[52] U.S. Cl. .................... 323/48; 317/17; 323/60
[51] Int. Cl.[2] .................... H04B 3/54; H04B 15/00
[58] Field of Search .......... 317/17; 323/6, 44 R, 48, 323/60, 85, 88; 336/69, 70

[56] References Cited
UNITED STATES PATENTS

| | | | |
|---|---|---|---|
| 3,244,960 | 4/1966 | Stevens et al. .................... | 323/44 R |
| 3,299,384 | 1/1967 | Lee .................... | 336/69 X |
| 3,612,988 | 10/1971 | Wanlass .................... | 323/60 X |

*Primary Examiner*—A. D. Pellinen
*Attorney, Agent, or Firm*—Edwin E. Greigg

[57] ABSTRACT

A neutralizing transformer arrangement having its primary winding connected in series with a D.C. blocking capacitor. The primary circuit is preferably series resonant at the power frequency (60 HZ), the capacitance of the series resonant circuit being provided by the D.C. blocking capacitor and, to some extent, by inter-turn, interwinding and distributed winding capacitances. The neutralizing transformer includes an input cable composed of one or more twisted pairs of wires over which communication frequencies signals pass. Each wire of a twisted pair is wound on opposite outer legs of the core of the transformer. A similar pair of isolating windings is wound on the same outer legs. The primary winding is wound about the central leg of the core of the transformer as is the one or more twisted pairs.

12 Claims, 5 Drawing Figures

NEUTRALIZING TRANSFORMER ARRANGEMENT

SUMMARY OF THE INVENTION

This invention relates to a neutralizing transformer arrangement. The invention relates, more particularly, to a neutralizing transformer arrangement useful in electric power transmission systems which depend upon communication facilities to effect proper operation and control.

An example of a known electric power transmission system associated with a neutralizing transformer having its primary winding connected between two different ground points and including secondary windings constituted by at least one twisted pair is disclosed in the U.S. Pat. No. 3,453,494 to Gordon Y. R. Allen, entitled "Neutralizing Transformers" granted July 1, 1969.

Neutralizing transformers are used to neutralize the effects of ground potential changes and longitudinally induced voltages due to proximity to power lines on communication lines which enter power substations. There are usually further circuits and equipment for drainage of high voltages induced in the communication cable as a result of being struck by lightning and for isolating terminal equipment to prevent such surges and changes in potential due to lightning strikes from damaging the terminal equipment.

Neutralizing transformers are usually built up on a shell-type of transformer core in which the primary winding is wound on the center leg as is the communication cable, representing the secondary, the output of the secondary being the communication frequency input to the terminal equipment. The primary winding is grounded to the substation mat at one end and to a remote ground outside of the influence of the substation ground at the other end, usually taken all the way back to the central telephone office. Thus, when changes in ground potential do arise, the primary winding is excited and bucks out similar changes which have occurred in the communication line which is used to carry control and audio signals. The flux lines circulate through the center leg of the core, split passing through the outer legs in magnetically opposite directions and join again as they enter the center leg of the transformer core.

It has been found that because the flux passes through the outer legs of the core in magnetically opposite directions, this flux direction provides a way of utilizing the outer legs for additional isolation windings without interference between the neutralizing windings and the isolation windings.

Electric power transmission systems, particularly high voltage systems, depend upon communication facilities to effect proper operation and control. In this instance the discussion relates to a wire line pair or pairs facility serving an electric power station. Such a facility, if used for protective relaying purposes, must remain uninterrupted prior to a fault on the power system, during the fault and immediately after the fault has been cleared. Power system faults vary in degree, phase angle and duration and are cause for a rise in power station ground potential, with respect to a remote ground point.

A fault can be initiated at any point on the 60 HZ current wave, i.e. anywhere from zero to maximum in each half cycle. Obviously, the fault can therefore be initiated at any point on the voltage wave. Power system faults consist of a symmetric A.C. component and the transient component which is essentially a D.C. component, decaying exponentially from its maximum to zero. Depending upon the X/R ratio of the power system and the precise point on the wave form at which the fault was initiated, the transient component can be very large and can result in a current nearly double that of the A.C. symmetric fault current or steadily state value of fault current.

Thus, under the worst case combination of factors the fault current, returning through ground, does in fact contain a large D.C. component, often called the D.C. offset. The decay time of this offset component is called the transient time period and the time is essentially controlled by the X/R ratio of the system and has, in fact, a duration of several cycles. Of course, it is the intent, in the operation of the system, to have the line cleared by the circuit breakers in as short a time as possible. This time element varies from about 3 cycles to 10 cycles or so before a backup relaying system comes into operation.

It is well known in the industry how a neutralizing transformer is used to protect a communication pair or pairs which serve or enter an electric power station, from the effects of power station ground potential rise and/or an induced voltage. One of the problems, however, is that since a neutralizing transformer has a steel core, it exhibits unacceptable exciting current characteristics in certain instances. Since the ground potential rise (G.P.R.) which is used to excite the primary of the neutralizing transformer contains, under worst case conditions, a D.C. component, the magnetic steel core can become magnetically saturated. The transformer will then require a very large increase in exciting current. Since in the neutralizing transformer secondary circuit the un-neutralizing voltage is, for practical purposes, the IR drop across the resistive impedance of the neutralizing transformer primary, it can be seen that this un-neutralized or remanent voltage can be very large if the exciting current becomes excessive due to an impedance drop in the transformer primary circuit, which occurs as a result of the reduction of the inductance of the transformer core, as a result of a polarization or saturation.

If a way could be found to prevent the D.C. component in the neutralizing transformer primary circuit from actually entering the transformer primary, then the transformer would not saturate under transient conditions. If saturation cannot occur, then the resulting damaging high remanent voltage cannot occur.

Theoretically, therefore, if the D.C. component could be prevented from entering the neutralizing transformer primary circuit, the transformer core would then not become saturated. Thus, the exciting current would remain that for a symmetrical wave form, and hence the remanent voltage in the secondary circuit would not increase over the design value on a symmetric basis and be cause for damage.

SUMMARY OF THE INVENTION

It is the principal object of the invention to provide a neutralizing transformer arrangement which eliminates the D.C. component of current which otherwise would flow in the primary winding of the transformer.

It is another object of the invention to provide a neutralizing transformer arrangement which avoids the problem of remanence from a D.C. produced asymmetric wave in a closed core neutralizing transformer having a steel core.

It is a further object of the invention to provide a neutralizing transformer arrangement which reduces the possibility of core saturation during faults.

It is an additional object of the invention to provide a neutralizing transformer arrangement which assures that communication and/or control signals can be supplied effectively to a substation prior to a fault, during a fault, and immediately after a fault.

It is still a further object of the present invention to provide a neutralizing transformer arrangement which need not include a gapped core structure.

The foregoing objects, as well as others which are to become clear from the text below, are accomplished in accordance with the present invention by providing a neutralizing transformer arrangement which includes a plurality of windings on a core, one of the windings being the neutralizing primary winding. A D.C. blocking capacitor is connected in series with the neutralizing primary winding.

In a preferred embodiment the neutralizing primary winding forms part of a series resonant circuit at the power frequency, the series capacitance being provided, at least in part, by the D.C. blocking capacitor.

Essentially, the blocking of the D.C. component from the primary winding is effected by the series connected capacitor. It is this concept which forms the basis of the invention. In closed core transformers core steel remanence becomes a serious contributing factor to the drastic increase in exciting current due to saturation. The elimination of the D.C. component thus reduces the core steel remanence problem to that only resulting from the symmetric wave, which is almost negligible. It is well understood by those skilled in the art just how core steel remanence comes about. If an asymmetric wave form leaves a transformer core polarized or with core steel remanence, the exciting current consequently becomes quite large. There is of course a 50/50 chance that the polarity of the exciting current at any one instant is additive or subtractive with respect to a previous core steel history. Nevertheless, the problem is significant.

Reference is made to the transient analysis, of the neutralizing transformer and particularly the saturation problems compounded by core steel remanence. Since the problem of core steel remanence can largely be eliminated by the use of a gapped core structure, it must also be recognized that such a gapped core structure must, of necessity, be considerably larger than a conventional core structure in order to retain the same original value of exciting current. Apart from an overall increase in size of the core, resulting in increased costs, the gapped core type of structure is itself considerably more costly to manufacture than a conventional construction thus compounding the cost increases. The capacitor blocking concept of the present invention reduces this cost increase to a negligible value; particularly when used with bifilar winding techniques wherein these are large values of inter-turn, interwinding, and distributed winding capacitances.

Since the frequency of the symmetric voltage of the original fault current is 60 HZ, it becomes obvious that the most efficient design will be one where the A.C. impedance of the primary winding is not materially altered and where the D.C. resistance of the entire primary circuit is very high. Therefore, if the size of the series capacitor is so chosen as to provide a series resonant L.C. circuit, then these conditions could be fulfilled. Since it is desirable to keep the value of the capacitor as small as possible, the value of the series capacitor should be designed considering the effective addition of resultant parallel capacitance of the transformer winding.

In operation, therefore, since the D.C. component of ground potential rise (G.P.R.) cannot pass through the capacitor, the exciting current of the transformer cannot increase. In addition, since no D.C. can pass through the transformer primary, there is no need to provide for air gaps in the transformer core. Therefore, the remanent of the secondary circuit will not be increased, the protector blocks will not operate and therefore the communication channel will not be disabled. A core steel remanence due to the D.C. transient current will not be generated.

In preferred embodiments of the present invention, the transformer arrangement includes the structure of a combined isolating and neutralizing transformer.

The use of a single core for two separate transformer functions reduces space requirements within the substation and otherwise necessary cabling which would be associated with installations using separate units for these separate functions.

DESCRIPTION OF THE PREFERRED EMBODIMENTS

Figure 1:
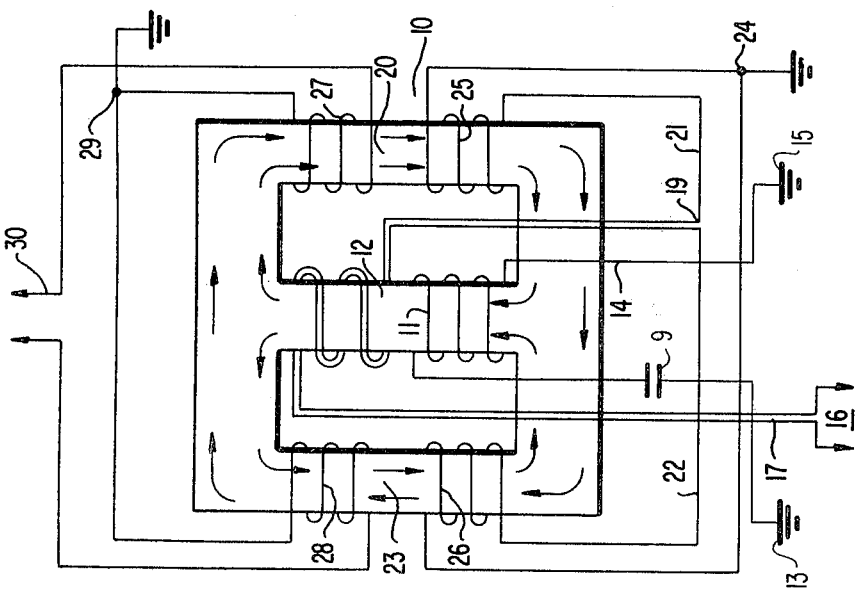
FIG. 1 is a schematic view of a transformer arrangement showing neutralization and isolation windings, a D.C. blocking capacitor being connected in series with the neutralizing primary winding in accordance with the present invention.

Referring now to FIG. 1, one embodiment of a neutralizing transformer arrangement according to the present invention includes a transformer shell core 10 having a primary winding 11 would around its center leg 12. One end of the primary winding 11 is grounded to a substation grounding mat 13 via a D.C. blocking capacitor 9. The other end of winding 11 is connected, via a cable 14, to a remote ground mat 15. The remote ground mat 15 is advantageously located outside of the influence of substation grounding mat 13 at a considerable distance therefrom. Usually the ground mat 15 is disposed at the central telephone office, while the local ground mat 13 is disposed at the substation at which the neutralizing transformer is located. Originating from the telephone central office 16 is a balanced twisted pair of a communication frequency cable 17. This cable is wound around the center leg 12 of transformer core 10.

The D.C. blocking capacitor 9, in accordance with a characteristic preferred feature of the present invention provides sufficient capacitance to assure that the primary circuit of the neutralizing transformer is series resonant at the power frequency, which generally is 60 HZ in commercial power systems used in the United States. It is to be understood that some of the capacitance may result from the effects of inter-turn, inter-winding and distributing winding capacitances of the neutralizing transformer as these effects appear in the primary circuit.

The individual wires 21, 22 of cable 17 are divided at point 19 which, in many installations, would be connected to the communication output in the event the isolation function of the transformer arrangement was not used. The wire 21 is wound around an outer core leg 20, forming a winding 25, and the other wire 22 is wound around an outer core leg 23, forming a winding 26. The remaining free ends of the windings 25 and 26 are connected together at a point 24, thus effectively placing both of the windings 25 and 26 in series.

Wound on the outer core leg 20 is a winding 27, which is similar to the winding 25 below it, as viewed in the drawing. In a similar manner, a winding 28 is wound on the outer core leg 23. The winding 28 is similar to the winding 26. The upper ends of the windings 27 and 28, as viewed in the drawing, are connected together at a point 29 effectively putting the windings 27 and 28 in series. The other ends of the windings 27 and 28 are brought out to the power station and provide a cable 30 which carries the control and communication frequency signals to the power station.

The direction of the windings 25 and 26 and the windings 27 and 28 is important in that each of the pairs of windings must reinforce rather than buck each other. It will also be observed that the communication frequency intelligence originating at a remote telephone central office 16 will be inductively coupled by the windings 25 and 26 to the windings 27 and 28 by normal transformer action to the output cable 30. Thus, the points 16 and 30 are electrically isolated from each other. If the windings 25 and 26 are made identical, a point 24 represents an accurate center tap position. Similarly, if the windings 27 and 28 are made identical, a point 29 represents an accurate center tap position.

Figure 2:
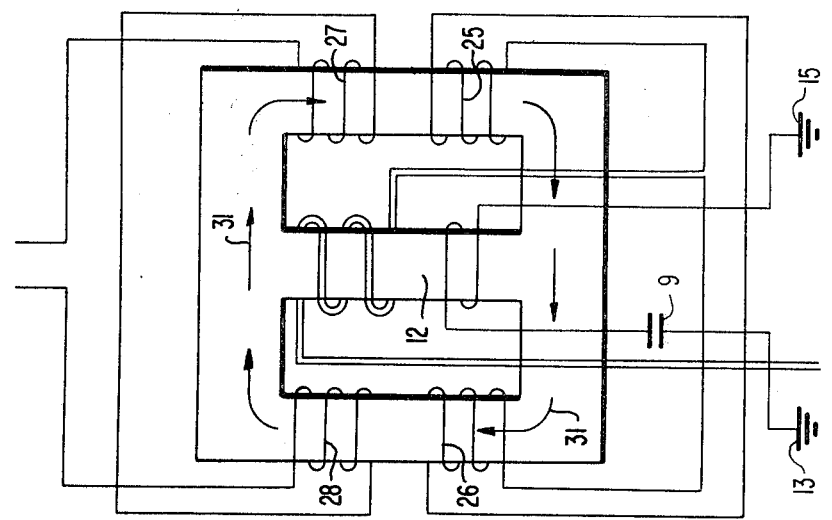
FIG. 2 is a schematic view of the transformer core of the transformer arrangement of FIG. 1 showing the flux path due to isolation transformer action.

Referring now to FIG. 2, there are shown flux paths 31 established when the communication frequency current is present in the windings 25 and 26. It will be noted that the flux is confined to the outer periphery of the core 10 and does not pass through the center core leg 12. It therefore induces a current in the windings 28 and 27, but not in the primary winding 11 or the secondary windings constituted by the twisted pair on the central leg 12 of the neutralizing section of the transformer.

Figure 3:
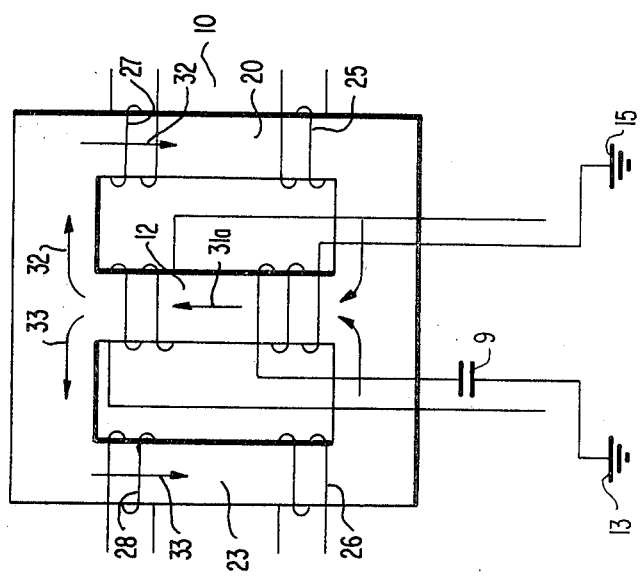
FIG. 3 is a schematic view of the transformer core of the transformer arrangement of FIG. 1 indicating the flux path due to the neutralizing transformer action.

Referring now to FIG. 3, there is shown a flux direction 31a due to neutralizing transformer action through the center leg 12 of the core 10. The flux lines divide into a flux path 32 through the outer core leg 20 and a flux path 33 through the outer core leg 23. The flux lines through the pair of series connected windings 27 and 28 also cut through the windings 25 and 26 and are in opposite directions and therefore cancel each other. Consequently, the 60 cycle current which may be present in the windings on the center core leg 12 will not be coupled into the windings 25, 26, 27 and 28 on the outer legs 20 and 23.

Because of the isolation effect developed by using the core 10 and winding arrangement described, any disturbing frequencies and/or the communication frequencies may be of any value without interference between the neutralizing and isolation sections of the transformer.

Figure 4:
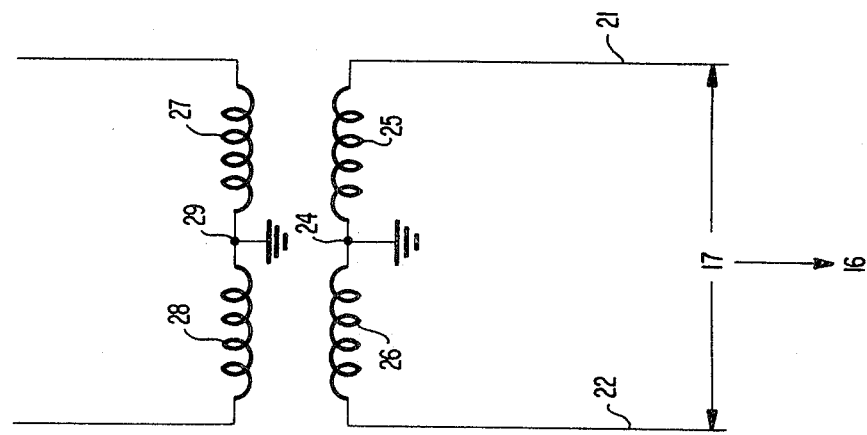
FIG. 4 is a schematic view of the isolation windings of the transformer arrangement of FIG. 1 illustrating their function as drainage reactors.

The transformer may also be used to provide the action of drainage reactors. Referring to FIG. 4, there is shown a schematic of the series windings 25 and 26 connected across the communication input wires 21 and 22 with the center tap point 24 grounded. One can readily see that if lightning strikes, a shunting effect is provided by the incoming cable 17 which is composed of wires 21 and 22, and which originated at the remote central telephone office 16.

The windings 25 and 26 shunt the voltage to ground at the grounded junction point 24. The windings also act as inductors limiting the current to safe levels. The windings 28 and 29 can perform the same function for the output side of the isolating section of the transformer if the center tap 29 is grounded, as indicated in FIG. 4.

An input cable may consist of more than one pair of conductors rather than just one pair, and all pairs or at least some, may be isolated by using a separate isolation winding.

To accomplish this requires the use of a carrier or audiotone system in which the intelligence is superimposed on the carrier or otherwise coded to fall within a specific filterable bandwidth.

Figure 5:
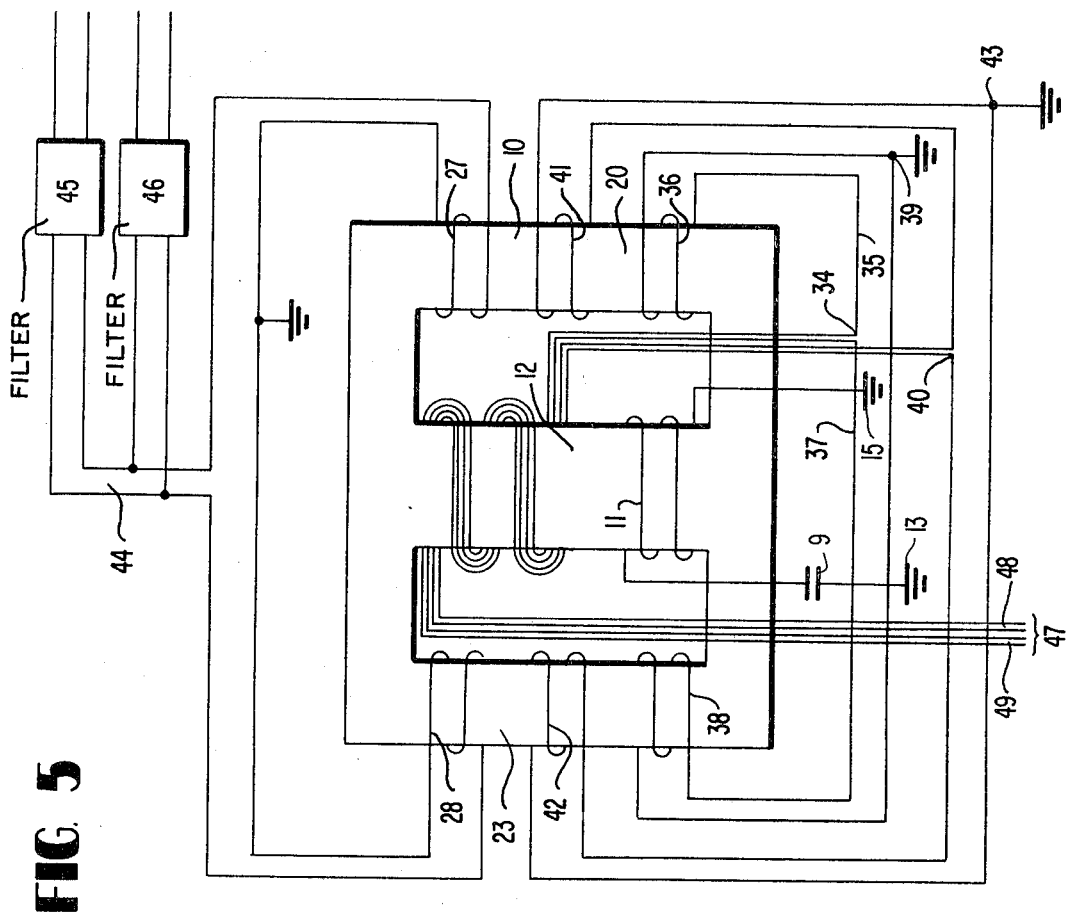
FIG. 5 is a schematic view of a further embodiment of a transformer arrangement according to the present invention illustrating the isolation of a multiple pair input cable.

Referring now to FIG. 5, there is shown a transformer core 10 with a primary winding 11 wound on a center leg 12 as hereinbefore described. A control and communication frequency input cable 47 includes two twisted pairs 48 and 49 instead of one as illustrated previously in FIG. 1 and is wound in the same manner on the center core leg 12 to provide neutralization. The cable 49 divides at a point 34, one wire 35 of the cable 48 being wound around the outer core leg 20, forming a winding 36, and the outer wire 37 of the cable 49 being wound around an outer core leg 23, forming a winding 38. The free ends of each of the windings 36, 38 are connected together at a point 39 effectively putting the windings 36 and 38 in series. In a similar manner, the cable 48 is divided at a point 40 and wound on the outer core legs 20 and 23, forming windings 41 and 42, which are connected in series at a point 43.

In a like manner to that in FIG. 1, the output windings 27 and 28 are wound respectively around the core legs 20 and 23.

In this arrangement, the windings 27 and 28 will have induced in them the combined signals due to the windings 36 and 38 and the windings 41 and 42, thereby effectively isolating an output cable 44 from the input cable 47; the signals are intermixed. The output cable 44 is divided into two parallel paths, one entering a filter 45 and the other entering a filter 46. The filter 45 is tuned to pass the carrier frequency and intelligence entering the transformer on twisted pair 49, and the filter 46 is tuned to pass the carrier frequency and intelligence entering the transformer on twisted pair 48, and therefore the intelligence is effectively separated into the two original channels.

One can easily deduce from the above description that any number of incoming pairs may be isolated, limited only by the ability to separate the channels at the output by filtering.

It is to be understood that modifications may be made in the windings of the isolation portion of the transformer without departing from the novelty and scope of this invention. For example, the windings may be placed on the lower or upper legs following the same principles heretofore described. Further, the core may be constructed with multiple outer legs providing not only additional space for multiple windings, but elimination of the need for filtering between windings on different sets of legs.

Although the foregoing description and accompanying illustrations disclose the present invention as applied to combined isolating and neutralizing transformers, it is to be appreciated that the invention can be equally well applied to combined isolating and neutralizing transformers of different constructions, and also to transformers which do not involve the isolating function, but only a neutralizing function.

It is to be understood that the term "saturation" as used in this specification does not mean exclusively a condition of flux density in the transformer core which would result in a permeability substantially the same as that of air, but also any condition of flux density in the transformer core which would result in its excitation at any point above the knee of the saturation characteristic of the core. Such points are below the point of maximum saturation.

It is to be appreciated that the foregoing description and accompanying illustrations set forth non-limiting exemplary embodiments which do not limit the spirit and scope of the invention, the scope of the invention being defined in the appended claims.

That which is claimed is:

1. A neutralizing transformer arrangement for use in a power system comprising, in combination: a transformer core, a plurality of windings on said transformer core, one of said windings being a primary neutralizing winding which is to be connected between two spaced-apart points in the power system, and means for preventing saturation of said transformer core, which means include a D.C. blocking capacitor connected in series with said neutralizing winding for preventing a transient direct current component of an asymmetrical fault or switching current from flowing through said neutralizing winding and saturating the transformer core.

2. A neutralizing transformer arrangement for use in a power system comprising, in combination: a transformer core, a plurality of windings on said transformer core, one of said windings being a primary neutralizing winding which is to be connected between two spaced-apart points in the power system, and a D.C. blocking capacitor connected in series with said neutralizing winding for preventing direct current from polarizing the transformer core, wherein ends of said primary neutralizing winding are coupled to two respective spaced-apart system ground points, one of said ends being coupled via said D.C. blocking capacitor.

3. A neutralizing transformer arrangement as defined in claim 2, wherein said capacitor and said primary neutralizing winding comprise a series circuit series resonant at a power frequency of a power system.

4. A neutralizing transformer arrangement as defined in claim 3, wherein said series resonant circuit includes, as its series capacitance, capacitance of said capacitor and capacitance provided by interturn, interwinding and distributed winding capacitances.

5. A neutralizing transformer arrangement as defined in claim 2, wherein said series circuit is resonant at a frequency of 60 HZ.

6. A neutralizing transformer arrangement as defined in claim 5, wherein said series resonant circuit includes, as its series capacitance, capacitance of said capacitor and capacitance provided by interturn, interwinding and distributed winding capacitances.

7. A neutralizing transformer arrangement as defined in claim 2, wherein said two respective spaced-apart system ground points are respectively a substation grounding mat, and a second grounding mat spaced at a substantial distance from said substation grounding mat.

8. A neutralizing transformer arrangement as defined in claim 7, wherein one plate of said D.C. blocking capacitor is connected to said substation grounding mat, its other plate being connected to one end of said primary neutralizing winding.

9. A neutralizing transformer arrangement as defined in claim 7, wherein said second grounding mat is disposed at a central communication office.

10. A neutralizing transformer arrangement as defined in claim 9, wherein one plate of said D.C. blocking capacitor is connected to said substation grounding mat, its other plate being connected to one end of said primary neutralizing winding.

11. A neutralizing transformer arrangement as defined in claim 2, wherein said core comprises a central leg and a pair of outer legs, said primary neutralizing winding being wound about said central leg, an additional winding of said plurality of windings being wound about said central leg, said additional winding being formed by at least one twisted pair of conductors, one of said conductors being wound about one outer leg, the other of said conductors being wound about the other outer leg, free ends of said conductors being connected together; and a respective isolating winding on each other leg, one of said isolating windings having one of its ends connected to one end of the other of said isolating windings, the other ends of said isolating windings being adapted to provide a communication output takeoff.

12. A neutralizing transformer arrangement as defined in claim 11, wherein said free ends of said conductors are connected together, and said connected ends of said isolating windings include means for providing a common ground connection.

* * * * *